June 20, 1939.　　　R. D. SMITH　　　2,162,980
METHOD OF COATING GLASS WITH METAL
Filed Dec. 19, 1936
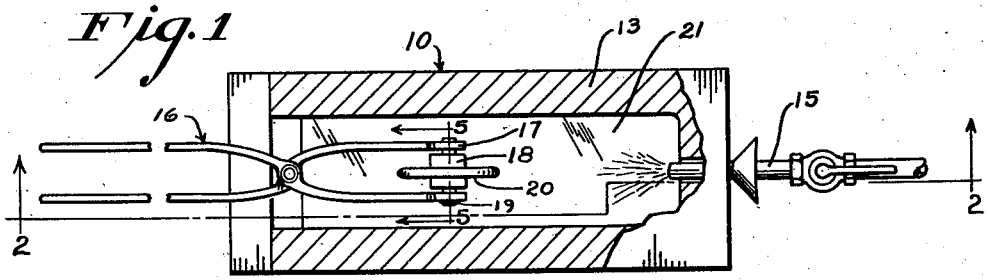
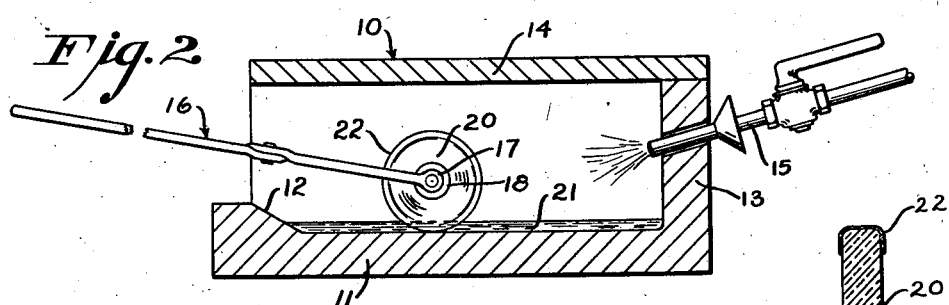
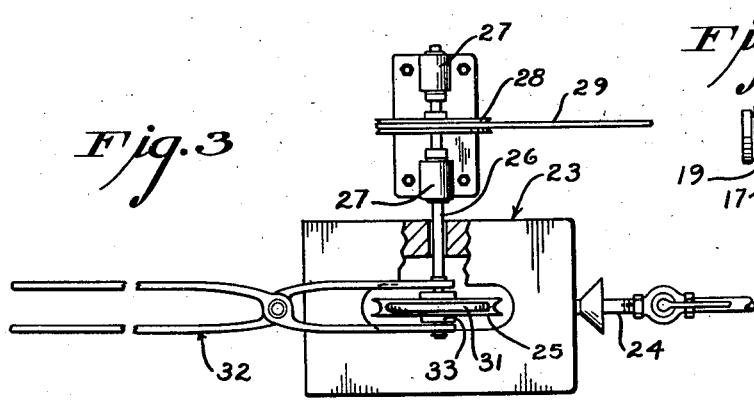
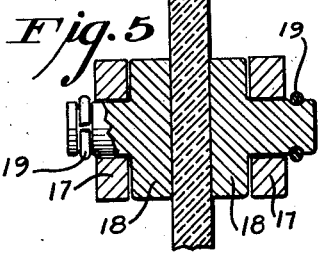
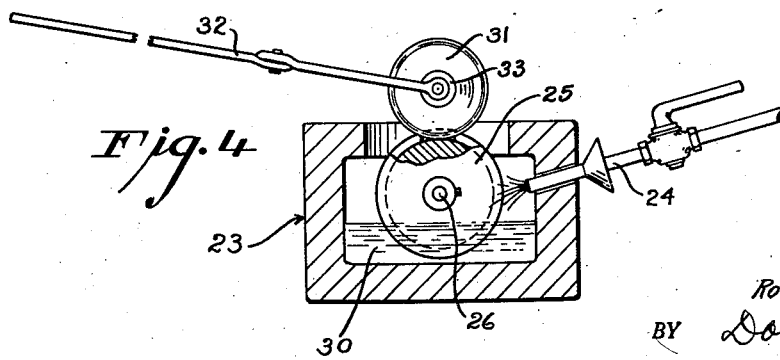
INVENTOR.
ROWLAND D. SMITH
BY Dorsey Cole
ATTORNEYS.

Patented June 20, 1939

2,162,980

UNITED STATES PATENT OFFICE 2,162,980

METHOD OF COATING GLASS WITH METAL

Rowland D. Smith, Corning, N. Y., assignor to Corning Glass Works, Corning, N. Y., a corporation of New York Application December 19, 1936, Serial No. 116,787

13 Claims. (Cl. 91—70.2)

This invention relates to metal coatings on glass and has for its object to produce on glass articles a coating of metal or alloy which is free from fluxes and has a higher melting point than the glass and is thermally sealed thereto.

In sealing to glass without the use of fluxes a metal having a melting point above that of the glass, it has heretofore been necessary to fuse the glass and apply it to the solid metal.

The present invention comprises melting the metal in a suitable container to form a pool of the molten metal therein and briefly contacting the glass with the molten metal to congeal a thin layer of the metal on the contacting surface of the glass and intimately unite it therewith.

I have found that when a glass article is brought into contact with a molten metal which is heated to a temperature substantially above the softening temperature of the glass, some of the metal is frozen or congealed on the relatively cold glass and at the same time the glass is heated locally to such a temperature that the congealed metal is united permanently to it. A thin coating of the metal is thus sealed to the glass surface and by this means I have been able to form on and seal with glass surfaces coatings of metals, such as copper and aluminum which have melting points above the softening point of the glass and this without the aid of fluxes. In order to avoid too great a thermal shock to the glass which might cause fracture, it is desirable to preheat the glass, although with some glasses possessing high thermal endurance or a sufficiently low coefficient of thermal expansion, such preheating is unnecessary. When aluminum is to be applied by my method to glasses of high softening temperature, it is essential that the glass, if preheated, should not exceed in temperature the melting point of the metal and preferably should not exceed the annealing temperature of the glass, since otherwise the metal would not congeal thereon. Metals such as lead, zinc, tin and the like, which have melting points below the annealing temperatures of ordinary glasses, are not suitable for my process because they cannot be congealed on to the glass surface at a temperature sufficiently high to cause sealing. On the other hand metals whose melting points are higher than about 1500° C. are unsuitable for use in my process because they heat the glass to such a degree as to cause distortion thereof and the layer of metal which congeals on the glass is so thick that breaking stresses are set up in the glass on cooling. It is therefore to be understood that metals, such as tungsten, molybdenum, titanium, vanadium, the noble metals platinum, rhodium, iridium, and osmium, and others having melting points higher than about 1500° C. are excluded from my process. I find it desirable to provide means for protecting the metal from excessive oxidation either while it is being applied or after it is applied to the glass. This may best be accomplished by maintaining a non-oxidizing atmosphere above the pool of molten metal.

In order that my invention may be more readily understood, reference is had to the accompanying drawing in which:

Fig. 1 is a plan view partly in section of a simple apparatus for metallizing the rims of glass roundels in accordance with the invention;

Fig. 2 is a vertical sectional view on the line 2—2 of Fig. 1.

Fig. 3 is a plan view partly in section of a modified apparatus for metallizing the rims of glass roundels in accordance with the invention;

Fig. 4 is a longitudinal sectional elevation through Fig. 3; and

Fig. 5 is an enlarged fragmentary vertical sectional view on line 5—5 of Fig. 1.

In Figs. 1 and 2 a horizontally disposed melting container or furnace, generally designated 10 and composed of graphite, fire clay or other refractory material, is provided with a bottom 11 having an upwardly projecting step 12, side walls 13, and a cover or crown 14. A burner 15 for heating the interior of the furnace is projected through the rear wall. Through the mouth of the furnace extends a pair of specially constructed tongs 16, the jaws of which have aligned holes therethrough and serve as bearings 17 for the shanks of rotatable inserts 18 of graphite or other refractory, as illustrated in detail in Fig. 5. The shanks of the inserts are held within the bearings 17 by spring clips 19 and the faces of the inserts serve as a separable chuck to grip a glass roundel 20 when the tongs are closed but at the same time to permit the roundel to turn with the inserts, the shanks of the latter constituting the axis of rotation of both the roundel and the inserts. On the bottom of the furnace and retained by the step 12 is a shallow pool 21 of molten metal such as copper or aluminum or alloy thereof, and the roundel 20 dips into the metal and on being rotated therethrough picks up a thin adherent coating of the metal 22 on its rim.

In Figs. 3 and 4, a melting container or furnace, generally designated 23, is composed of graphite, clay or other refractory material and is heated with a burner 24 which projects through its wall. Within the furnace 23, a solid wheel or disc 25, of nickel-chromium alloy known as Nichrome or other non-scaling high melting metal or alloy, having a grooved periphery is mounted on a heat resisting shaft 26 of nickel or other high melting metal which projects through the side wall of the furnace. The shaft 26 passes through bearings 27 located outside of the furnace and is provided with a pulley 28 and belt 29 which is driven by a motor (not shown). The lower edge of the grooved disc 25 dips into a pool of molten metal 30, such as copper or aluminum or alloys thereof, which is disposed on the bottom of the furnace while the upper edge of the disc 25 projects into an opening in the top of the furnace. Resting upon the exposed upper edge of the disc 25 is a roundel 31 held between the jaws of a pair of tongs which are generally designated 32 and which are identical in their construction with the tongs 16, being provided with rotatable graphite or clay inserts 33 which grip the roundel 31 in a pivotal manner.

In practicing my invention a quantity of a metal or alloy having a melting point above the annealing temperature of the glass and preferably above the softening temperature but below 1500° C., such as aluminum or copper or alloys thereof, is placed within the furnace 10 and melted by means of the burner 15 to form the molten pool 21 of the desired depth. The glass roundel 20, which has previously been preheated up to or above its strain temperature, is grasped with the tongs 16 in the manner shown and is introduced into the mouth of the furnace 10 whereupon it is rolled rapidly along the bottom of the furnace through the pool of molten metal 21 and is then withdrawn from the furnace and annealed in the usual manner. As the edge of the glass roundel comes in contact with the molten metal, some of the latter is congealed upon its contacting surface and forms the thin layer 22 adhering permanently thereto. Since the furnace 10 and the molten metal 21 are heated to a temperature above the softening point of the glass, it is essential that the operation be performed quickly to avoid distorting the glass and also to avoid picking up too thick a layer of congealed metal. In order to avoid oxidation of the molten metal while it is being applied to the glass, a non-oxidizing atmosphere is maintained within the furnace. This is easily accomplished by suitable adjustment of the air-gas ratio of the flame.

The process can be carried out more advantageously by means of the apparatus shown in Figs. 3 and 4. In this case enough metal is introduced into the furnace 23 so that when melted by the burner 24 it will form the pool 30 of sufficient depth to contact and wet the disc metal 25. The latter is then revolved by means of the shaft 26 and pulley 28 at a moderate speed and the grooved periphery of the disc 25 will carry a uniform thin coating of metal from the pool 30. The preheated roundel 31 is grasped between the inserts 33 of the tongs 32 and its edge is brought into contact with the metal coated periphery of the revolving disc 25 at the point where the disc projects upwardly into the top of the furnace. The relatively rapid motion of the periphery of the disc 25 causes the contacting glass roundel 31 to rotate thereby bringing each point on the edge of the roundel successively in contact with the metal coated groove of the disc. It will be seen that by this means the length of time of contact of any part of the edge of the glass roundel can be made very brief, depending upon the speed of rotation of the disc 25 and a very thin and very uniform layer of the metal will be transferred to the edge of the roundel by congealing thereon. A non-oxidizing atmosphere may be maintained in the furnace 23 by suitable adjustment of the burner 24 in order to prevent oxidation of the molten pool of metal 30.

The invention is particularly useful for metallizing the edges of glass articles for the purpose of soldering them to other parts, either of metal or of glass similarly metallized, because the metal coatings obtained by this process are free from fluxes and can be soldered to directly without an intermediate electroplating operating as has heretofore been necessary. The copper metallized glass roundel which has been shown and described above can be soldered directly into a closure for a metal container and it will be obvious that other glass articles can be metallized by this process without departing from the scope of the invention as claimed.

I claim:
1. The method of coating a glass article with metal, which includes forming a pool of molten metal, the melting point of which is above the annealing point of the glass but below 1500° C., preheating the glass to a temperature below its softening point and introducing the glass into the pool for a period of time sufficient to congeal a layer of the metal on the glass but insufficient to cause appreciable deformation of the article.

2. The method of coating glass with metal, which includes forming a pool of molten metal the melting point of which is above the annealing point of the glass but below 1500° C., preheating the glass to a temperature below the melting point of the metal, introducing the heated glass into the molten metal and allowing a layer of the metal to congeal on the surface of the glass.

3. The method of coating glass with metal, which includes forming a pool of molten aluminum, preheating the glass to a temperature below the melting point of aluminum and introducing the glass into the molten aluminum and allowing a layer of aluminum to congeal on the surface of the glass.

4. The method of coating glass with metal, which includes forming a pool of molten copper, preheating the glass to a temperature below its softening point, and introducing the heated glass into the molten copper and allowing a layer of copper to congeal on the surface of the glass.

5. The method of coating glass with metal, which includes forming a pool of molten metal whose melting point is above the annealing point of the glass but below 1500° C., maintaining a non-oxidizing atmosphere above the pool of molten metal, preheating the glass to a temperature below the melting point of the metal, and introducing the heated glass into the molten metal and allowing a layer of the metal to congeal on the surface of the glass.

6. The method of coating glass with metal, which includes forming a pool of molten aluminum, maintaining a non-oxidizing atmosphere thereover, preheating the glass to a temperature below the melting point of aluminum, and introducing the heated glass into the molten aluminum and allowing a layer of aluminum to congeal on the surface of the glass.

7. The method of coating glass with metal, which includes forming a pool of molten copper, maintaining a non-oxidizing atmosphere thereover, preheating the glass to a temperature below its softening point, and introducing the heated glass into the molten copper and allowing a layer of copper to congeal on the surface of the glass.

8. The method of coating glass with metal, which includes melting a metal whose melting point is above the annealing point of the glass but below 1500° C., forming a molten film thereof on a refractory surface, preheating the glass to a temperature below the melting point of the metal, and contacting the heated glass with the molten film to congeal a layer of the metal on the contacting surface of the glass.

9. The method of coating glass with metal, which includes melting a metal whose melting point is above the annealing point of the glass but below 1500° C., to form a molten pool thereof in a receptacle, contacting a rotating roll of refractory material with the molten metal in such manner as to continuously coat the rotating roll with a film of molten metal, preheating the glass to a temperature below the melting point of the metal, and contacting the heated glass with the film of molten metal to congeal a layer of the metal on the contacting surface of the glass.

10. The method of coating glass with metal, which includes melting copper to form a molten pool thereof in a receptacle, contacting a rotating roll of refractory material with the molten pool so as to maintain a film of molten copper on the rotating roll, preheating the glass to a temperature below its softening point, introducing the heated glass into the rotating film of molten copper to congeal a layer of copper on the contacting surface of the glass and maintaining a non-oxidizing atmosphere above the molten pool and around the roll.

11. The method of coating glass with metal, which includes congealing a layer metal on a glass article by introducing the latter while at a temperature below its annealing temperature into a bath of molten metal, the melting temperature of which lies below 1500° C. but above the annealing temperature of the glass.

12. The method of coating glass with metal, which includes congealing a layer of copper on a glass article by introducing the latter while at a temperature below its softening temperature into a bath of molten copper.

13. The method of coating glass with metal, which includes congealing a layer of aluminum on a glass article by introducing the latter while at a temperature below its annealing temperature into a bath of molten aluminum.

ROWLAND D. SMITH.